Oct. 25, 1938.  A. P. FERGUESON  2,134,360
TIRE COVER
Filed May 29, 1936   3 Sheets-Sheet 1
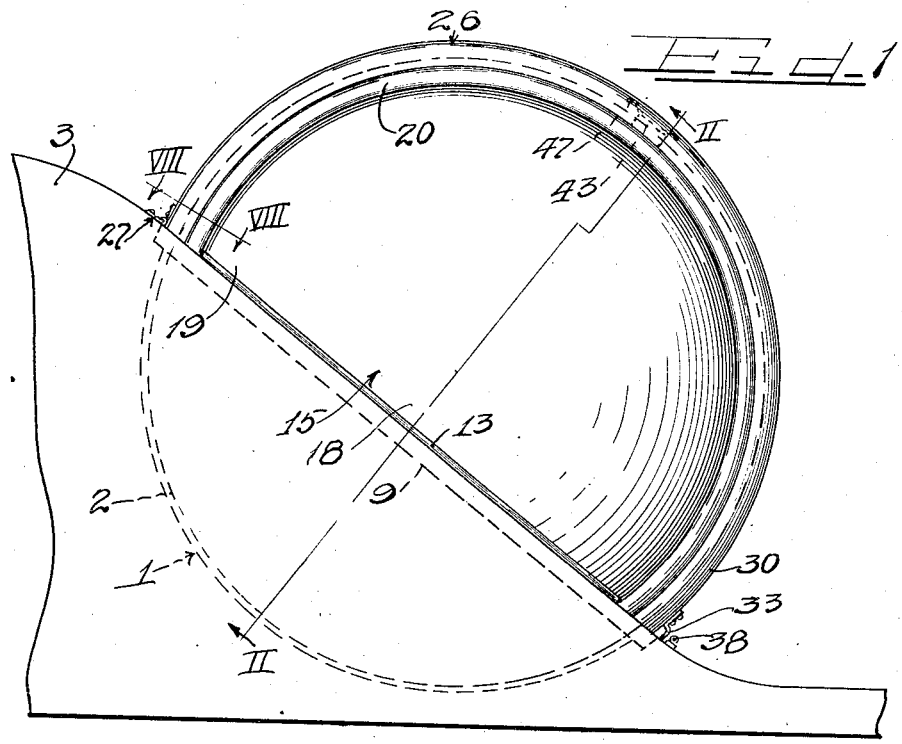
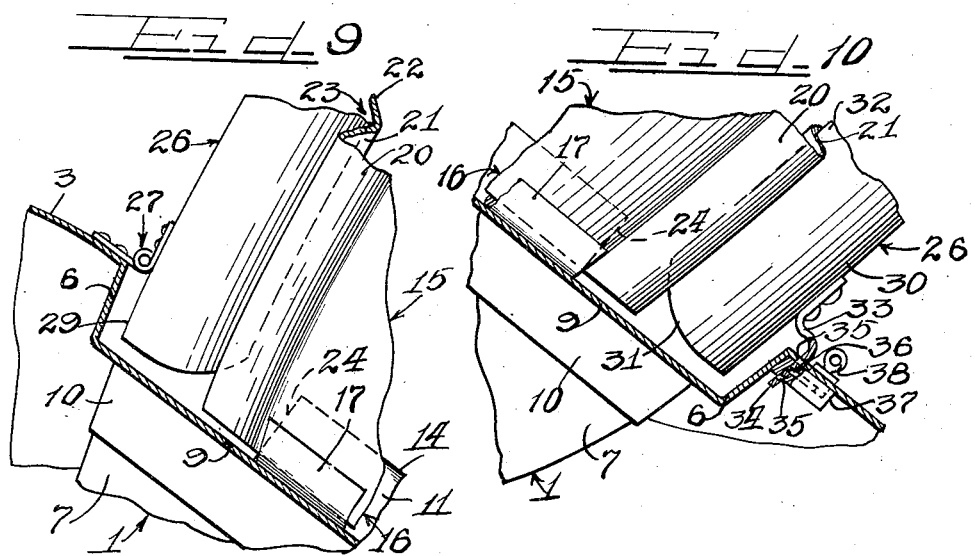
Inventor
Arthur P. Fergueson.
By Charles O. Hill Attys.

Oct. 25, 1938.  A. P. FERGUESON  2,134,360
TIRE COVER
Filed May 29, 1936   3 Sheets-Sheet 2
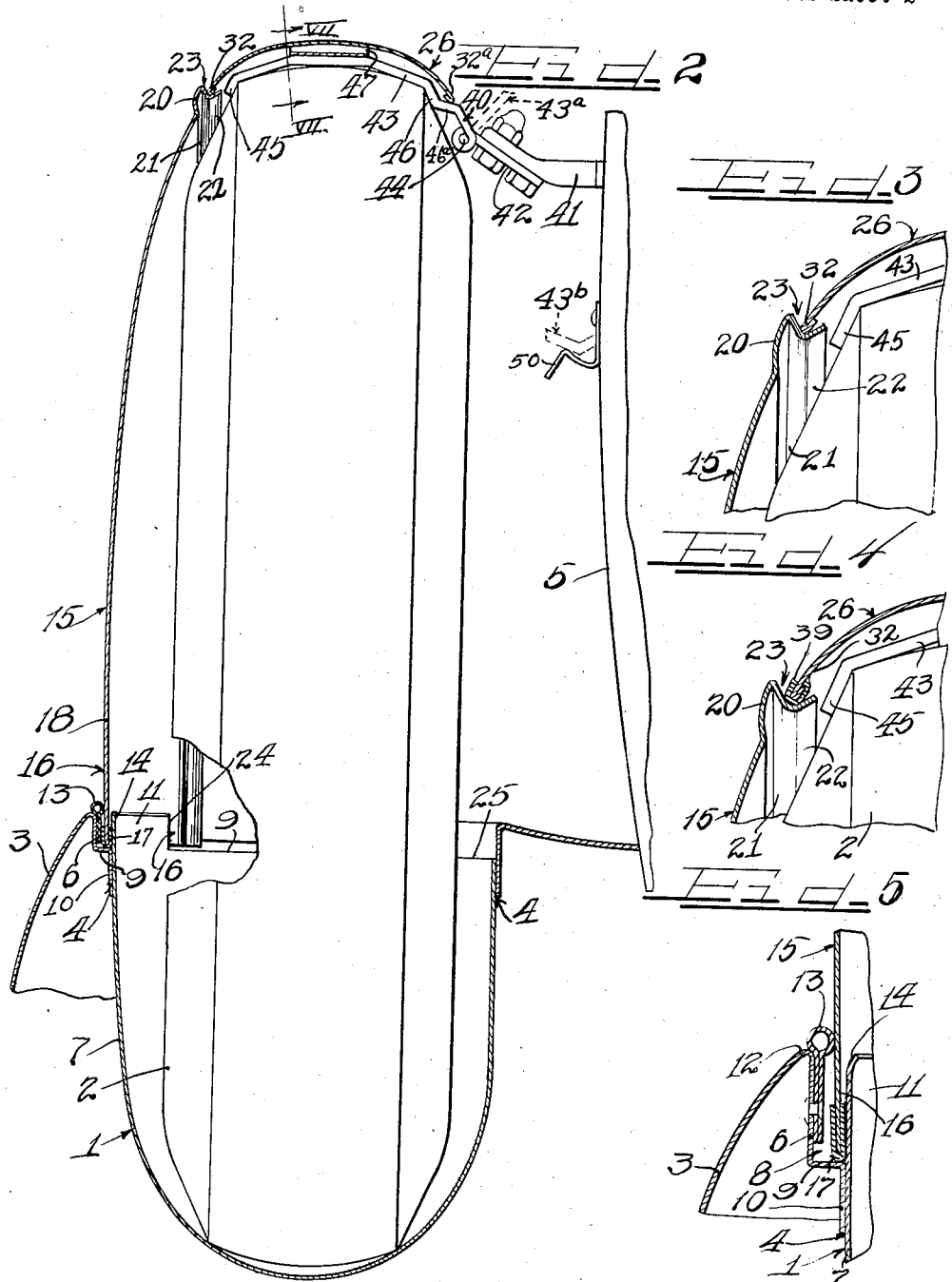
Inventor
Arthur P. Fergueson
By Charles M. Hill Attys Oct. 25, 1938.  A. P. FERGUESON  2,134,360
TIRE COVER
Filed May 29, 1936  3 Sheets-Sheet 3
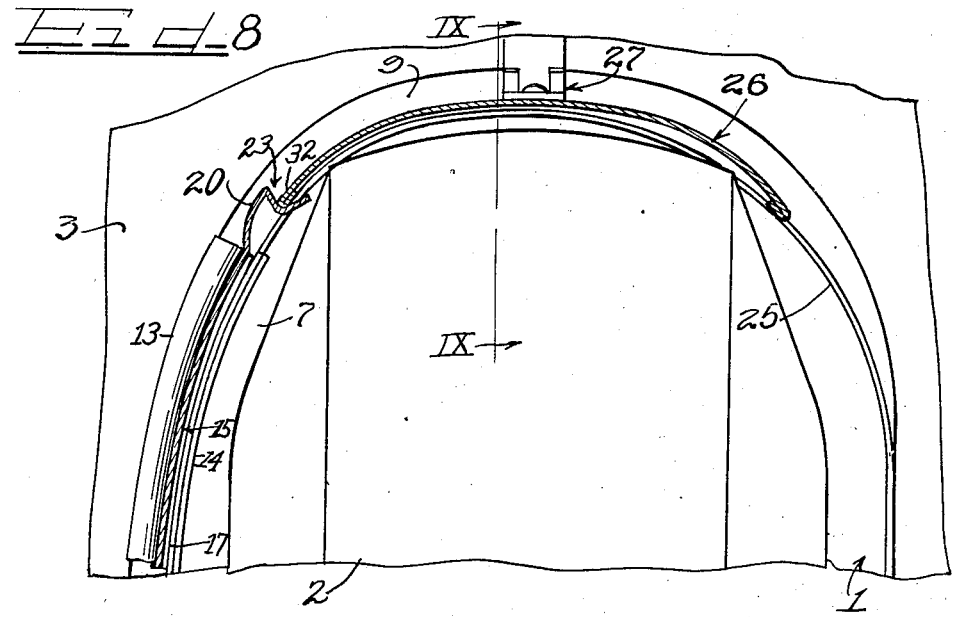
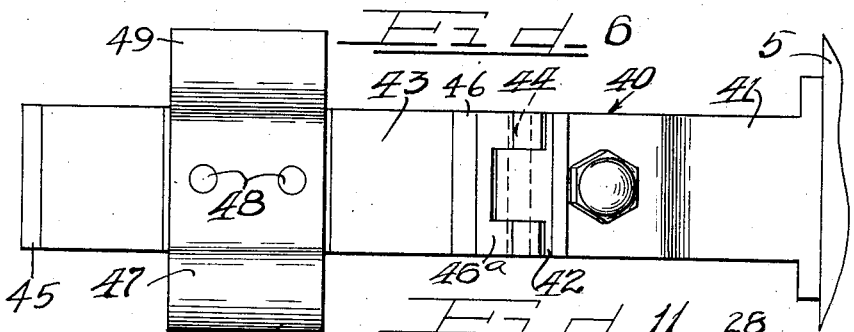
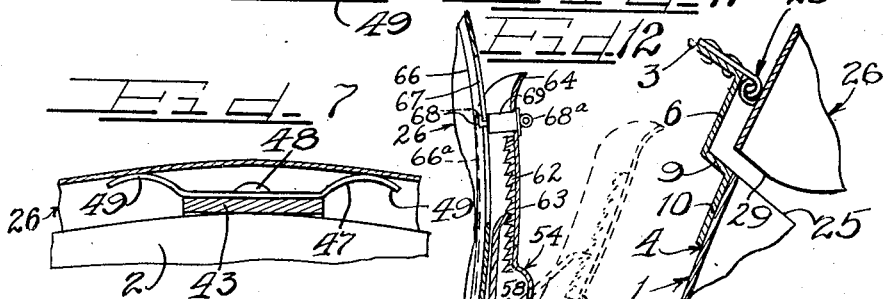
Inventor
Arthur P. Fergueson

Patented Oct. 25, 1938

2,134,360

UNITED STATES PATENT OFFICE 2,134,360

TIRE COVER

Arthur P. Fergueson, Detroit, Mich., assignor, by mesne assignments, to Houdaille-Hershey Corporation, Detroit, Mich., a corporation of Michigan Application May 29, 1936, Serial No. 82,396

2 Claims. (Cl. 224—29)

This invention has to do with tire covers and is concerned more particularly with a tire cover adapted for cooperation with a well such as a fenderwell for receiving a spare tire.

It is an object of the invention to provide an improved multi-part tire cover construction adapted for cooperation with a well such as a fenderwell, to fit tires of different sizes and shapes without permitting such tires to rattle.

It is also an object of the invention to provide a cover structure which may be readily applied in proper tire protecting position and embodies means for also shielding the outer side of the wheel on which the tire is carried.

A further object of the invention involves the provision, in connection with a well such as a fenderwell, of a spare tire cover embodying means for holding the cover securely in place regardless of the presence or absence of the tire.

It is another object of the invention to provide a multi-part tire cover construction adapted to cooperate with a well such as a fenderwell, the cover construction being such that the securement of one of the parts serves to secure the cooperating part or parts in proper tire covering position.

Another object of the invention involves the provision of a tire cover structure embodying a side plate and a tread covering ring member, the plate being adapted to be supported by a well such as a fenderwell independently of the support for the ring member.

In accordance with the general features of the invention, a preferably resilient split band made to cover the tread of a tire is either separably or fixedly hinged adjacent one end at the mouth of one end of the well, and means at the mouth of the other end of the well is provided to cooperate with the corresponding end of the band to secure or lock the same in the desired position of adjustment. A side plate is adapted to cover the portion of the tire and wheel exposed between the mouth of the well and the band, and is constructed to have a telescopic cooperation with the outer side of the well and to be supported by the well. An inner side plate also may be employed. Yieldable means provided at the telescoping portions of the well and plate may be employed to prevent rattling, squeaking and metal to metal contact and to hold the plate against wobbling. The outer periphery of the plate or plates and the adjacent portion of the band are formed so that they are mutually received when the band is in tire tread covering position. By tightening down the band, as with an adjustable toggle clamp, screw clamp or other clamp means, the band is clamped to the periphery of each plate and the plate is clamped down against the well. A clamp element preferably carried by the vehicle at the inner side of the tire, or by an inner plate which may be permanently fastened or releasably mounted as at the inner side of the well, affords an inverted cradle straddling the thread. This element is preferably engageable with an inner part of the band to support it against twisting. When an inner side plate is used, it will be preferably engageable with the inner margin of the band to prevent twisting of the band. Spring means disposed between the cradle and the adjacent portion of the band serves to hold the cradle in firm engagement with the tire when the band is secured in tread covering position. The cradle accordingly presses against the tire and holds the same against movement in and transverse to its plane.

It is thus apparent that the construction is extremely simple since it may be readily assembled and disassembled without requiring movement of the tire or wheel carrying the same. Consequently the cover may be secured in place irrespective of the presence of the tire and therefore the unattractive appearance of the opening in the well is done away with.

Further objects and advantages of the invention will appear as the description proceeds.

This invention (in preferred forms) is illustrated in the drawings and hereinafter more fully described.

Figure 1 is a fragmentary elevational view showing one form of the invention.

Figure 2 is an enlarged fragmentary sectional view taken substantially in the plane designated by the line II—II in Figure 1.

Figure 3 is an enlarged view, partly in section and partly in elevation, of the cooperating portions of the tire cover members appearing at the upper left of Figure 2.

Figure 4 is a view similar to Figure 3 but including cushion means preventing metal to metal contact between the members.

Figure 5 is an enlargement of the cooperative telescoping portions of the fender and cover, appearing at the lower left of Figure 2.

Figure 6 is an enlarged plan view of the tread clamping and holding structure shown in Figure 2.

Figure 7 is a fragmentary sectional view taken substantially as indicated by the line VII—VII in Figure 2.

Figure 8 is an enlarged fragmentary sectional view taken substantially as indicated by the line VIII—VIII in Figure 1.

Figure 9 is a fragmentary sectional view taken substantially as indicated by the line IX—IX in Figure 8.

Figure 10 is a view similar to Figure 9 but showing details of construction at the opposite end of the cover construction.

Figure 11 shows a modified hinge construction between the cover and the fender.

Figure 12 is a view similar to Figure 10 but shows a modified clamp and lock structure and associated cover band, fender and well.

Referring now more particularly to the drawings, the well 1 chosen for illustrative purposes for supporting the spare tire 2 is shown supported by an automobile fender 3 at the front of an automobile. While the well may be integrally united to the member or secured thereto in any other suitable way, it is preferably welded as at 4. The fender 3 illustrated is at the left of the vehicle, extending as it does outwardly from the vehicle body 5, as seen in Figure 2.

A longitudinal upwardly opening pocket is preferably provided at the outer side of the well to accommodate a part of the tire cover of the invention as will appear hereinafter. Accordingly, instead of having the depending skirt 6 on the fender at the outer side of the well connected directly to the top of the well, said skirt is offset outwardly of the outer wall 7 of the well to provide a space, and at the lower part the skirt 6 is projected inwardly at 9 to provide a ledge, forming the bottom of the pocket 8. From the rear portion of the ledge 9, the fender has a second depending portion 10 which is welded or otherwise suitably secured to the outer wall 7 of the well 1. The inner wall of the space or pocket 8 is formed by an upward extension 11 at the outer side of the well wall 7, said extension terminating at substantially the same level as the adjacent rim 12 of the fender 3 although it may terminate above or below said level.

An anti-rattling strip 13, made of any suitable cushioning material such as rubber is secured at the pocket 8 in such a manner as to project transversely into and extend substantially continuously or at intervals throughout the length of the pocket 8 for engagement with a tire cover member as will appear. The free upper margin of the well extension 11 is preferably turned or bent away from the pocket 8 as shown at 14 to form a cam portion for guiding the cover member into the pocket 8 as will appear.

The cover construction embodying the invention comprises a side plate 15 for covering the outer side of the spare wheel and tire. This side plate may be formed to cover the wheel only or the side of the tire only, if desired. It is shaped in the form of a segment of a circle, corresponding to the shape of the portion of the wheel and/or tire exposed from the well 1. The periphery of the cover member is accordingly formed from an arc of a circle and a substantially straight line or chord terminating at the ends of the arc. The margin at the chord is designated generally by the reference numeral 16, and is received in an anti-rattling, protective cushion strip 17 of substantially U-shape in cross-section. The plate 15 may be curved in cross-section so that its central portion 18 projects outwardly somewhat more than the outer peripheral portion 19, and accordingly the portions of the well and fender forming the pocket 8 may be similarly shaped as will be evident upon inspection of Figure 8.

The side plate 15 at its outer peripheral margin is formed into an outwardly bulged bead 20 which has both an ornamental and a reinforcing effect. Instead of terminating at the outer periphery of the bead 20, the side plate is bent inwardly and rearwardly therefrom at 21 and rebent rearwardly and outwardly at 22 to provide an outwardly opening peripheral groove or recess or space 23, preferably substantially coextensive with the arcuate periphery of the plate 15. The anti-rattling strip 17 applied to the chord margin 16 of the plate 15 preferably terminates at the ends of the bead 20, and the pocket 8 is preferably substantially coextensive with the strip 17 so that when the strip 17 and associated margin of the plate 15 are deposited in the pocket 8, the ends of the bead are clear of said pocket so that the anti-rattling strip 13 does not interfere with the deposit and removal of the bead ends. The ends of the pocket are determined by the ends of the upward extension 11 on the front wall 7 of the well, as shown at 24 in Figures 2, 8, 9 and 10. From the ends 24 of the extension 11, the top edge 25 of the well is substantially continuous and is arranged so as to be disposed below the ends of the bead 20 when the plate 15 is disposed in the pocket 8. The ledge 9, forming the bottom of the pocket 8, is extended beyond the well extension 11 and disappears preferably at the rear side of the well as will be evident from Figures 2 and 8. It will be evident that when the plate 15 is properly deposited in the pocket 8, it will be held in an upstanding position, firmly and without rattling, so as to shield the exposed portions of the spare wheel and tire received in the well 1.

The other tire cover part embodying the invention comprises a preferably resilient rim or band member 26 preferably of sheet metal although other suitable material may be employed. The band 26 is shaped to extend substantially entirely across the tread of the tire to cover the same and is of substantially concavo-convex cross-section with its convex surface outermost. The cover member 26 is preferably of substantially the same arcuate extent as the side plate 15 and, adjacent one end thereof, is either permanently hinged at 27, or temporarily and removably hooked or hinged at 28, to the fender 3 at one end of the well. The hinge may be provided at the rear or lower end of the well, instead of the front or upper end as illustrated.

The hinge at 28 may be disassembled by swinging the band upward slightly to afford lateral clearance between the interlinked parts of the hinge so that the band at this point may be lowered free of the hinge hook on the fender. Then by first moving the band rearwardly and thereafter raising it the band may be completely separated from the fender and well.

The extremity 29 at the hinged end of the band is adapted to project below the top level of the fender 3 into the recess formed by the fender skirt 6 and adjacent ledge 9, its extremity 31 adapted to fit likewise below the top level of the fender 3 at the other end of the well. Thus the bottom edge portions of both tire cover parts are located out of view when the cover structure is in proper cooperative relation to the well.

The band 26 is provided with an outer margin 32 formed with a smooth edge by folding the material as shown, and this margin is shaped and arranged to fit in the peripheral recess 23 formed in the cover plate 15. The inherent contractibility of the band 26 may be such that after being swung down over the outer periphery of the plate 15, as shown in Figure 1, it will exert inward pressure on the plate at the periphery thereof and thus cooperate with the fender and well to firmly hold the plate in position without substantial movement. However, it is preferred that the free end of the band be clamped in place, as by a toggle or screw clamp means. The band may be locked against unauthorized removal and, to this end, there may be provided at the free end 30 of the band a bracket 33 provided with a plunger 34 having one or more holes 35 adapted selectively to receive a detent 36 which is carried in a lock housing 37 at the underside of the fender. The detent may be spring pressed and adapted to snap into a hole 35 and controlled by a key 38 or by a safe combination, or in any other suitable way so as to prevent unauthorized access thereto. A plurality of openings 35 are preferably provided, as it may be desirable to adjust the band 26 in view of manufacturing variations which are likely to occur, to insure a proper cooperative relation between the parts. The bracket 33 may be formed with a lateral ledge as shown providing a push-down surface for convenience in tightening, and providing a hook or handle which may be grasped by a finger for pulling the band up to open position.

To further insure against squeaking or metal to metal contact and provide a weather seal, the margin 32 of the band 26 may be fitted in spaced cushion elements or a cushion strip 39, preferably of U-shape in cross-section, as shown in Figure 4.

The transverse curvature of the band 26 at its juncture with the plate 15 is preferably in substantial continuation of the transverse curvature of the plate at the bead 20, so that when the two cover parts are in cooperative relation, they have the appearance of a single integral cover member provided with a bead adjacent the outer periphery of the structure.

The back margin 32a of the band 26 may be formed similar to the margin 32 if desired.

In order to keep the spare tire 2 from wobbling, a unique holding means is provided. This holding means is designated generally by the reference numeral 40 and comprises a bracket 41 suitably permanently attached to the vehicle body 5 so as to be positioned rearwardly of the tire. Suitably secured to the bracket 41 is a hinge strap 42 to which a time holding member 43 is hinged at 44. The member 43 is freely swingable and is adapted to extend across the tread of the tire at the upper part thereof. The holding member 43 is of bowed formation to receive the tire tread and is provided with longitudinally spaced portions 45 and 46 adapted, when the member 43 is in place over the tire tread, to engage the edges of the tread and extend toward the side walls of the tire, serving as retainer portions to prevent movement of the tire in directions transverse to the median plane of the tire. The member 43 will therefore hold the tire 2 in position in the well 1 without assistance so that the tire will not interfere with the application and removal of the cover structure. The retaining portions 45 and 46 extend inwardly sufficiently to enable the member 43 to accommodate tires of different diameters. An abutment 46a adjacent the portion 46 is engageable with the inner margin 32a of the band to assist the outer plate 15 in preventing twisting of the band. When an inner plate is used, it will serve the purpose of the abutment.

To the end that the tire may be held firmly against movement in its own plane, both when the vehicle is stationary and when it is moving, means is provided for causing the member 43 to be clamped against the tire tread. This means may take any desired form, and in the illustrated form comprises a leaf spring 47 riveted at 48 or otherwise suitably secured to an intermediate portion of the holding member 43. The spring 47 is provided with wings 49 bowed away from the axis of the tire when the member 43 is in cooperative relation to the tire, and normally projects outward to such an extent that when the band 26 is secured in proper cooperative relation to the shield 15, said wings are pressed inward so as to exert a substantial clamping action on the member 43, forcing the same into firm engagement with the tread of the tire 2. Upon locking of the band 26 in position, it will be apparent that not only is the side plate 15 locked but also the spare wheel and tire.

Instead of using the well 1 as a means for supporting the spare wheel and tire, they may be supported by a bracket extending from the body 5 and bolted or otherwise suitably secured to the portion of the wheel employed in bolting the wheel to the under structure of the automobile for service, or the wheel could be supported in any other suitable way.

The supporting bracket structures 41 and 42 for the clamping and holding member 43 could be made integral with each other, and may be connected to the body 5 closer to the well or at any other suitable point. A plurality of such members spaced circumferentially relative to the tire may be employed.

When no tire is disposed in the well, the member 43 may be held as at 43b against rattling by any suitable means, such as the spring retainer 50 secured to the body 5 or to an inner side plate. The member 43 may be positioned out of the way as shown in dotted lines at 43a in Fig. 2 preparatory to the deposit and removal of the tire relative to the well. After the tire is deposited in the well, it is held momentarily and the member 43 is swung down over the tread into the position shown in Figure 2. Thereafter the member 43 alone will hold the tire in place, so that the cover may be applied without requiring attention to the tire. Likewise, the cover may be removed without requiring attention to the tire.

It will be seen from the foregoing that when it is desired to remove the tire, the detent 36 may be released and thereafter the bracket 33 may be employed as a handle to facilitate swinging up of the band 26 about the hinge 27 or 28 as the case may be. When the band 26 is swung sufficiently, the plate 15 is released therefrom to such an extent as to permit the plate to be lifted out of the pocket 8 and removed. Thereafter, the tire may be readily removed. Likewise, with the band 26 swung out of the way, the tire may be deposited in the well and then the plate 15 deposited in the pocket 8, after which the band 26 may be swung down into interlocked relation to the outer peripheral portion of the plate 15. This plate, as will be observed, is telescoped into the fender structure and the band is telescoped into the plate.

It will be appreciated that the plate could be formed with a groove to receive a longitudinal strip on the fender structure, thereby reversing the illustrated arrangement. Likewise, the cooperative peripheral portions of the plate and band could be reversed so as to provide the plate with a peripheral projection and the band with a cooperating peripheral recess for receiving the projection.

Instead of making the anti-rattling strips 13, 17 and 39 continuous, each may comprise two or more parts in a series.

The ends of the band are preferably telescoped into the well below the top of the fender so that they are shielded by the fender.

Any type of locking means may be employed, that illustrated in Figures 1 and 10 serving by way of example only. If desired, the lock mechanism may embody a toggle serving to releasably and adjustably hold the end 30 of the band in proper telescoping relation to the center.

Although the cover structure illustrated extends over more than 180°, it will be appreciated that its extent may be substantially equal to or less than 180°. When substantially in excess of 180°, the band 26 may serve, by virtue of its inherent contractibility, to hold itself and the side plate in place preparatory to securement of the free end 30 of the band. When substantially less than 180° in extent, the telescoping of the free end of the band relative to the fender will serve to hold it in place so as to also hold the side plate in place pending positive securement of said free end as by the lock means.

In Figure 12 one form of toggle clamp structure is illustrated. It comprises a stationary hinge strap 51 secured in a corresponding depression 52 in the fender and well so as to be substantially flush with the adjacent inner surface 53 of the well. A movable toggle lever 54 of substantially channel shape is pivoted at one end 55 as at 56 to the strap 51. The cover band 26 is provided adjacent its free end with a hinge strap 57 fixedly united thereto. A pawl 58 is hinged at 59 to the strap 57. The pawl carries a lug 60 engageable with the strap 57 to limit swinging of the pawl rearwardly to the extent indicated in dotted lines. Thus the pawl is always ready for use without requiring it to be swung up from a pendant position.

The toggle lever 54 is bulged at the lower part 61 thereof to receive and shield the hinge structure at 56 and 59. A ratchet strip 62 is secured to the web 63 of the upper part of the lever in a position where its teeth are selectively engageable with the pawl 58 in accordance with the clamp adjustment desired. The upper end 64 of the lever is open sufficiently to receive a finger of the hand to enable the lever to be conveniently pulled rearwardly to release the toggle connection.

It will be observed that the lower end 65 of the web of the lever is arranged to limit rearward swing of said member by abutting the strap 51 when the lever is swung to a position slightly below that shown in dotted lines. The dotted line showing of the lever is included in Figure 12 to indicate the position of the lever where it may engage the pawl preparatory to clamping the band to a side plate smaller than the side plate clamped when the lever is in the full line position shown.

The arrangement of the hinges 56 and 59 and the ratchet and pawl engagement is such that when the lever 54 is in the full line position for any adjustment, the axis of the hinge 59 is to the right, viewing Figure 12, of the line joining the axis of the hinge 56 and the place of engagement of the ratchet elements. This arrangement is maintained by the pressure of the spring means 47.

The band may be provided with a longitudinal bead 66 adapted to be received between the sides 66a of the lever 54 to cooperate therewith and assist the other coacting parts in holding the end of the band against lateral movement. The substantial engagement of the sides of the strap 57 with the sides 66a of the lever may serve this function in the absence of such bead.

If desired any suitable releasable theftproof locking means, key or otherwise controlled, may be provided in conjunction with the clamp device or elsewhere. For example, the band 26 may be provided with a longitudinally extending slot 67 through which a latch 68 may pass to engage the inner face of the band. The latch 68 may be spring pressed so as to automatically snaplock itself to the band upon the final thrust of the toggle lever, and require a key 68a or the like to release the same, or a key or the like may be applied to the lock barrel 69, from which the latch extends, to both lock and release the latch. The slot 67 is of sufficient length to accommodate the latch for any adjustment of the clamp means. The cooperating bead and lever portions and/or the cooperating sides of the strap 57 and lever promote registration of the latch and slot.

The straps 51 and 57 and the ratchet 62 may be welded, brazed, riveted or otherwise fastened in place.

I am aware that many changes may be made and numerous details of construction may be varied through a wide range without departing from the principles of this invention, and I, therefore do not purpose limiting the patent granted hereon otherwise than is necessitated by the prior art.

I claim as my invention:

1. In combination with a well, such as a fender well, for receiving a spare tire, a cover for the tire, means fixed with relation to the fender well and including means movable into engagement with the tire for holding it stationary pending positioning of the cover in proper shielding relation to the tire, yieldable means operatively interposed between the cover and said movable means and secured to one of the same for transmitting pressure from said cover to said movable means to firmly force the latter against the tire to prevent rattling of the tire in the well and means securing the cover to the well for creating said pressure.

2. In combination with a well, such as a fender well, for receiving a spare tire, a cover for the tire, means fixed with relation to the fender well and including means movable into engagement with the tire for holding it stationary pending positioning of the cover in proper shielding relation to the tire, yieldable means operatively interposed between the cover and said movable means and secured to one of the same for transmitting pressure from said cover to said movable means to firmly force the latter against the tire to prevent rattling of the tire in the well, (said cover including a band cover member for disposition over the tread of the tire and a side plate extending between said band member and said well and terminating in said well in close proximity to its mouth—and means for detachably securing the band to the well for creating said pressure.

ARTHUR P. FERGUESON.